(12) United States Patent
Yu

(10) Patent No.: US 9,897,190 B2
(45) Date of Patent: Feb. 20, 2018

(54) BELT-DRIVEN STARTER-GENERATOR

(71) Applicant: LG INNOTEK CO., LTD., Seoul (KR)

(72) Inventor: Hyun Soo Yu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 91 days.

(21) Appl. No.: 14/548,558

(22) Filed: Nov. 20, 2014

(65) Prior Publication Data

US 2015/0141184 A1 May 21, 2015

(30) Foreign Application Priority Data

Nov. 20, 2013 (KR) ........................ 10-2013-0141566

(51) Int. Cl.

| | |
|---|---|
| *F16H 7/20* | (2006.01) |
| *F16H 55/36* | (2006.01) |
| *F16D 1/06* | (2006.01) |
| *F16H 7/02* | (2006.01) |
| *F02N 11/04* | (2006.01) |
| *F02N 15/08* | (2006.01) |
| *H02K 5/20* | (2006.01) |
| *H02K 7/10* | (2006.01) |
| *F02N 15/00* | (2006.01) |

(Continued)

(52) U.S. Cl.
CPC ............. *F16H 55/36* (2013.01); *F02N 11/04* (2013.01); *F02N 15/08* (2013.01); *F16D 1/06* (2013.01); *F16H 7/02* (2013.01); *H02K 5/20* (2013.01); *H02K 7/1004* (2013.01); *F02B 67/06* (2013.01); *F02N 15/006* (2013.01); *F02N 2250/00* (2013.01); *H02K 9/19* (2013.01); *H02K 2213/03* (2013.01); *Y10T 403/7018* (2015.01)

(58) Field of Classification Search
CPC ......... Y10T 403/7021; Y10T 403/7024; Y10T 403/7018; F16D 1/0876; F16H 55/566
USPC ......................................................... 474/198
See application file for complete search history.

(56) References Cited

U.S. PATENT DOCUMENTS

| | | | | |
|---|---|---|---|---|
| 827,023 | A | * | 7/1906 | Knoener ............... F16D 1/0876 384/420 |
| 1,372,510 | A | * | 3/1921 | Hetzel ................... B65G 39/20 474/198 |

(Continued)

FOREIGN PATENT DOCUMENTS

| | | |
|---|---|---|
| CN | 2904450 Y | 5/2007 |
| FR | 1 215 121 A | 4/1960 |
| FR | 2 950 753 A1 | 4/2011 |

OTHER PUBLICATIONS

Partial European Search Report dated Jun. 15, 2015 issued in Application No. 14193878.7.

*Primary Examiner* — Henry Liu
(74) *Attorney, Agent, or Firm* — KED & Associates, LLP

(57) ABSTRACT

A belt-driven starter-generator includes a rotary shaft, and a pulley belt coupled on an outer peripheral surface of the rotary shaft. A key is press-fitted into a pocket formed between the rotary shaft and the pulley belt so as to fix the rotary shaft to the pulley belt. A coupling member is coupled to a thread formed on the outer peripheral surface of the rotary shaft so as to support one side of the pulley belt. Operational reliability and assembly convenience may be improved by the belt-driven starter-generator of the present disclosure.

13 Claims, 3 Drawing Sheets

(51) Int. Cl.
*F02B 67/06* (2006.01)
*H02K 9/19* (2006.01)

(56) References Cited

U.S. PATENT DOCUMENTS

| | | | | |
|---|---|---|---|---|
| 1,460,222 A * | 6/1923 | Benjamin | F16B 3/00 | 403/356 |
| 2,073,661 A * | 3/1937 | Tibbetts | F16F 7/02 | 192/70.17 |
| 2,563,166 A * | 8/1951 | Gardner | F16B 3/00 | 403/358 |
| 2,633,031 A * | 3/1953 | Browning | F16H 55/566 | 403/167 |
| 2,693,397 A * | 11/1954 | Baker | B62D 55/15 | 384/418 |
| 2,855,787 A * | 10/1958 | Kumro | F16H 55/566 | 403/356 |
| 3,237,469 A * | 3/1966 | Berry | F01L 1/02 | 403/230 |
| 3,250,553 A * | 5/1966 | Detwiler | F16H 55/56 | 403/358 |
| 3,415,137 A * | 12/1968 | Casale | F01L 1/02 | 123/90.15 |
| 3,501,973 A * | 3/1970 | Casale | F16H 1/00 | 403/356 |
| 3,661,023 A * | 5/1972 | Maurey | F16H 55/566 | 403/317 |
| 3,815,432 A * | 6/1974 | Maurey | B66D 3/04 | 474/43 |
| 3,920,343 A * | 11/1975 | Blue | F16D 1/0876 | 403/356 |
| 4,089,611 A * | 5/1978 | Riegler | F16B 19/02 | 403/358 |
| 4,095,803 A * | 6/1978 | Meier | F01P 5/10 | 123/196 R |
| 4,348,132 A * | 9/1982 | Mullenberg | F16D 1/094 | 403/356 |
| 4,504,249 A * | 3/1985 | Fortier | F16H 55/566 | 403/358 |
| 4,572,698 A * | 2/1986 | Rauch | B63H 23/34 | 403/318 |
| 4,695,183 A * | 9/1987 | Greenberg | F16D 1/0876 | 403/259 |
| 4,955,944 A * | 9/1990 | Aso | F01P 3/12 | 123/41.31 |
| 4,993,865 A * | 2/1991 | Nagashima | B27B 17/00 | 403/259 |
| 5,181,432 A * | 1/1993 | Allen | F01L 1/02 | 116/200 |
| 5,418,400 A * | 5/1995 | Stockton | F02N 11/04 | 290/22 |
| 5,531,537 A * | 7/1996 | Pink | F04C 15/0073 | 29/447 |
| 5,538,355 A * | 7/1996 | Burr | F04C 15/0076 | 403/355 |
| 5,553,966 A * | 9/1996 | Morelli | F16D 1/0876 | 403/355 |
| 5,688,070 A * | 11/1997 | Morelli | F16D 1/0876 | 403/355 |
| 6,152,849 A * | 11/2000 | Mori | F16H 15/38 | 403/356 |
| 6,301,782 B1 * | 10/2001 | Jacks, Jr. | F01C 17/02 | 29/402.08 |
| 6,425,838 B1 * | 7/2002 | Matsubara | B60K 6/26 | 475/13 |
| 6,484,596 B2 * | 11/2002 | Puchas | F02N 11/04 | 123/179.28 |
| 6,568,063 B1 * | 5/2003 | Sweeney | F16D 1/09 | 29/525.01 |
| 6,752,560 B2 * | 6/2004 | Wilson | F04D 29/044 | 403/1 |
| 6,758,781 B2 * | 7/2004 | Kusumoto | F16H 3/54 | 475/13 |
| 6,905,280 B2 * | 6/2005 | Brunner | F16D 1/08 | 403/355 |
| 7,411,324 B2 * | 8/2008 | Kusumi | H02K 11/048 | 310/68 D |
| 7,863,787 B2 * | 1/2011 | Lafontaine | H02K 3/50 | 310/71 |
| 7,919,892 B2 * | 4/2011 | Neet | H02K 7/08 | 310/263 |
| 8,267,615 B2 * | 9/2012 | Zhang | F16D 1/0882 | 403/356 |
| 2011/0052316 A1 * | 3/2011 | Chen | F16D 3/06 | 403/356 |
| 2011/0268498 A1 * | 11/2011 | Robinson | F16D 1/0847 | 403/356 |
| 2011/0268499 A1 * | 11/2011 | Zhang | F16D 1/0882 | 403/358 |
| 2015/0135855 A1 * | 5/2015 | Mokhbery | G01L 3/14 | 73/862.08 |

\* cited by examiner

BELT-DRIVEN STARTER-GENERATOR

CROSS-REFERENCE TO RELATED APPLICATION

This application claims priority under 35 U.S.C. § 119 to Korean Application No. 10-2013-0141566 filed on Nov. 20, 2013, whose entire disclosure is incorporated herein by reference.

BACKGROUND

1. Field

The present disclosure relates to a belt-driven starter-generator.

2. Background

In general, a vehicle includes a starter motor for driving an engine and an alternator for generating electricity using torque of the engine. In the starter motor, an ignition switch is connected to a battery power source through an operation of a driver when the vehicle is started, and thus driving force generated by supply of power to the starter motor rotates the engine so that the vehicle start.

On the other hand, the alternator is connected to a drive portion of the engine to generate alternating current power by rotation of a rotor in a state in which a magnetic field is formed through the driving force of the engine, and the alternating current power is converted using a rectifying device so as to charge the battery.

Both of the starter motor and the alternator have a structure configured of a stator and a rotor. Accordingly, since the starter motor and the alternator have a very similar structure, the starter motor and the alternator may function as either a generator or a motor according to application of force or power thereto.

In recent years, a belt-driven starter-generator (BSG) structure which can serve as both of a stator motor and an alternator by one structure has been actively pursued. In the belt-driven starter-generator, a pulley belt is coupled to an upper end of a rotary shaft rotated by a motor. Specifically, after a woodruff key is laterally inserted into the rotary shaft, the pulley belt is assembled and fixed by fastening a nut thereto.

However, when the motor is driven at a high speed, the fixed coupling of the nut to the pulley belt becomes loose, resulting in malfunctions and deteriorated reliability. Further, there is difficulty in assembling the pulley belt since the woodruff key is laterally inserted into the rotary shaft.

BRIEF DESCRIPTION OF THE DRAWINGS

The embodiments will be described in detail with reference to the following drawings in which like reference numerals refer to like elements wherein.

DETAILED DESCRIPTION

Figure 1:
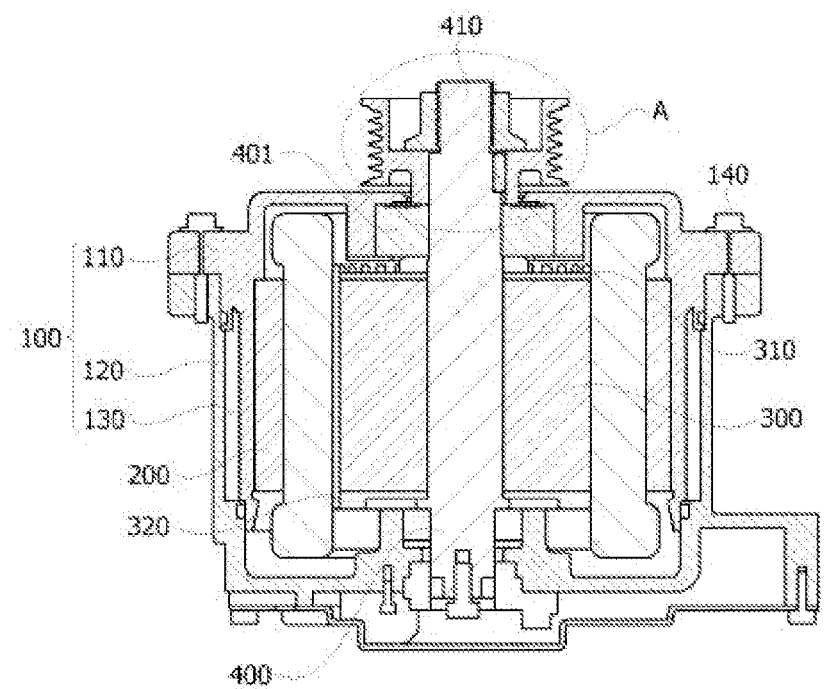
FIG. 1 is a cross-sectional view illustrating a belt-driven starter-generator according to an embodiment of the present disclosure.
Figure 2:
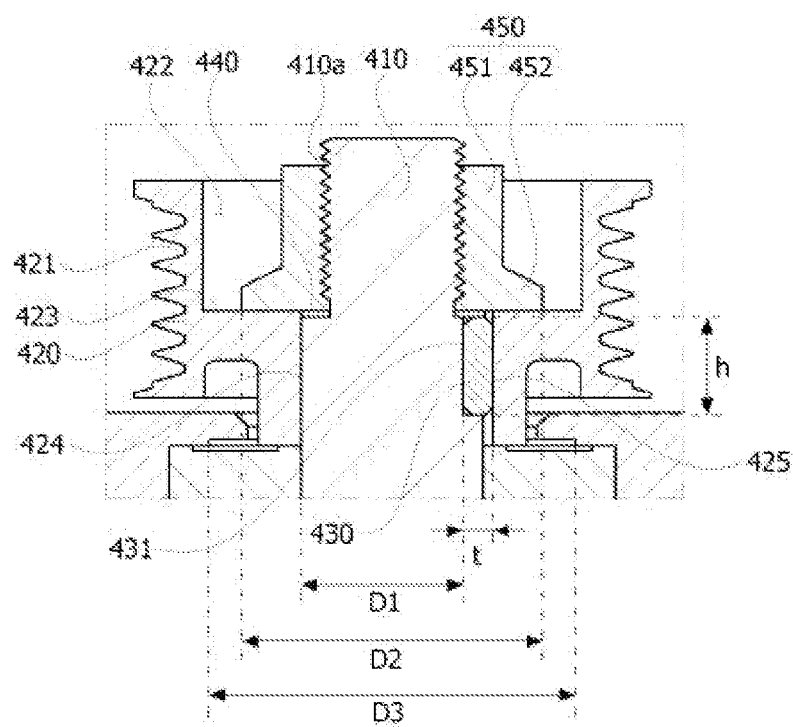
FIG. 2 is an enlarged view of portion A in FIG. 1.

Referring to FIGS. 1 and 2, the belt-driven starter-generator according to the embodiment of the present disclosure includes a housing 100, a stator 200, a rotor 300, a rotary shaft 400, a pulley belt 420, a key 430, a tension washer 440, and a coupling member 450.

The housing 100 has a cylindrical shape and has a space defined therein such that the stator 200 and the rotor 300 may be mounted in the space. The housing 100 may be formed in various shapes or of various materials, but a metal material having high thermal resistance may be selected due to characteristics of the housing mounted on a vehicle.

The housing 100 includes a first housing 110 and a second housing 120. The first housing 110 accommodates the stator 200 and the rotor 300, and the second housing 120 accommodates a portion of the first housing 110. The first housing 110 is fixed to the second housing 120 by a fastening portion 140. Through coupling of the first and second housings 110 and 120, the stator 200 and the rotor 300 are blocked from the outside.

A cooling channel 130 is formed between an outer side of the first housing 110 and an inner side of the second housing 120. The stator 200 and the rotor 300 may be cooled by circulation of coolant in the cooling channel 130. Since the cooling channel 130 is integrally formed in the housing 100, the structure thereof is simplified and the size of a motor may be reduced. However, the present disclosure is not limited thereto, and an air-cooled structure or a water-cooled structure may be properly selected as the cooling structure. The housing 100 may have a properly modified structure according to a cooling method.

The stator 200 is inserted into the inner space of the housing 100 and has a space portion defined therein. The stator 200 may be a fixed structure including coils and a plurality of cores around which the coils are wound, and may be formed by stacking plate-shaped stator plates having the same shape to a predetermined height.

The rotor 300 is inserted into the space portion provided in the stator 200, and coupled on an outer peripheral surface of the rotary shaft 400. The rotor 300 may be formed by stacking a plurality of core plates having a disc shape. A plurality of magnets mounted on the rotor 300 are arranged so as to face the stator 200, and each magnet may be inserted and coupled to the rotor 300 through a hole formed in the rotor 300.

Upper and lower magnet support plates 310 and 320 may be tightly arranged at the top and bottom of the rotor 300, respectively. The magnet support plates 310 and 320 are tightly arranged at the top and bottom of the rotor 300 in order to prevent the magnets from being separated from the rotor 300 when the rotor 300 rotates at a high speed.

The rotary shaft 400 is formed at a central portion of the rotor 300 so as to pass through the same. When the rotary shaft 400 rotates, the rotor 300 rotates along with the rotary shaft 400. On the contrary, when the rotor 300 rotates, the rotary shaft 400 may rotate along with the rotor 300. The rotary shaft 400 may be coupled into the housing 100 so as to be rotatable by a bearing 401. A thread is formed on one end 410 of the rotary shaft.

Referring to FIG. 2, the pulley belt 420 is coupled on the outer peripheral surface of the rotary shaft 400 which rotatably supports the rotor 300, and is configured such that a belt moving according to engine power is coupled to the pulley belt 420 so as to rotate the rotary shaft 400 and the rotor 300. The pulley belt 420 may also be configured to rotate external parts (for instance, an engine) by the rotation of the rotor 300. A plurality of grooves 421 are formed on an outer peripheral surface of the pulley belt 420 so that a groove belt (not shown) may be fastened to the grooves.

When the belt-driven starter-generator according to the embodiment functions as an alternator, the rotor 300 is rotated while the pulley belt 420 is rotated by driving of the engine, thereby generating an alternating current. The generated alternating current may be converted into a direct current to be supplied to external parts (for instance, a battery).

When the belt-driven starter-generator according to the embodiment functions as a starter motor, the pulley belt 420 connected to the rotary shaft 400 is rotated while the rotor 300 is rotated by a drive current, thereby enabling external parts (for instance, an engine) to be driven.

The pulley belt 420 includes a receiving groove 422 to which the one end 410 of the rotary shaft is exposed, and a through-hole 424 which is formed on a bottom surface 423 of the receiving groove 422 so that the rotary shaft 400 is inserted into the through-hole 424. The one end 410 of the rotary shaft 400 passes through the through-hole 424 and is exposed to the receiving groove 422.

The coupling member 450 is coupled to the exposed one end 410 of the rotary shaft. The coupling member 450 includes a nut portion 451 coupled to the one end 410 of the rotary shaft and a fixed portion 452 which is connected to the nut portion 451 to come into contact with the bottom surface 423 of the receiving groove 422. A hole, which is screw-coupled with a thread 410a formed at the one end 410 of the rotary shaft, is formed at a center of the nut portion 451. When the nut portion 451 is coupled to the one end 410 of the rotary shaft, the fixed portion 452 presses the bottom surface 423 of the receiving groove 422. The fixed portion 452 may have a disc shape and have a flat contact surface.

The receiving groove 422 has a diameter D3 greater than a diameter D1 of the through-hole 424 and a maximum linear width D2 of the coupling member 450. Accordingly, the coupling member 450 is easily inserted into the receiving groove 422.

Figure 3:
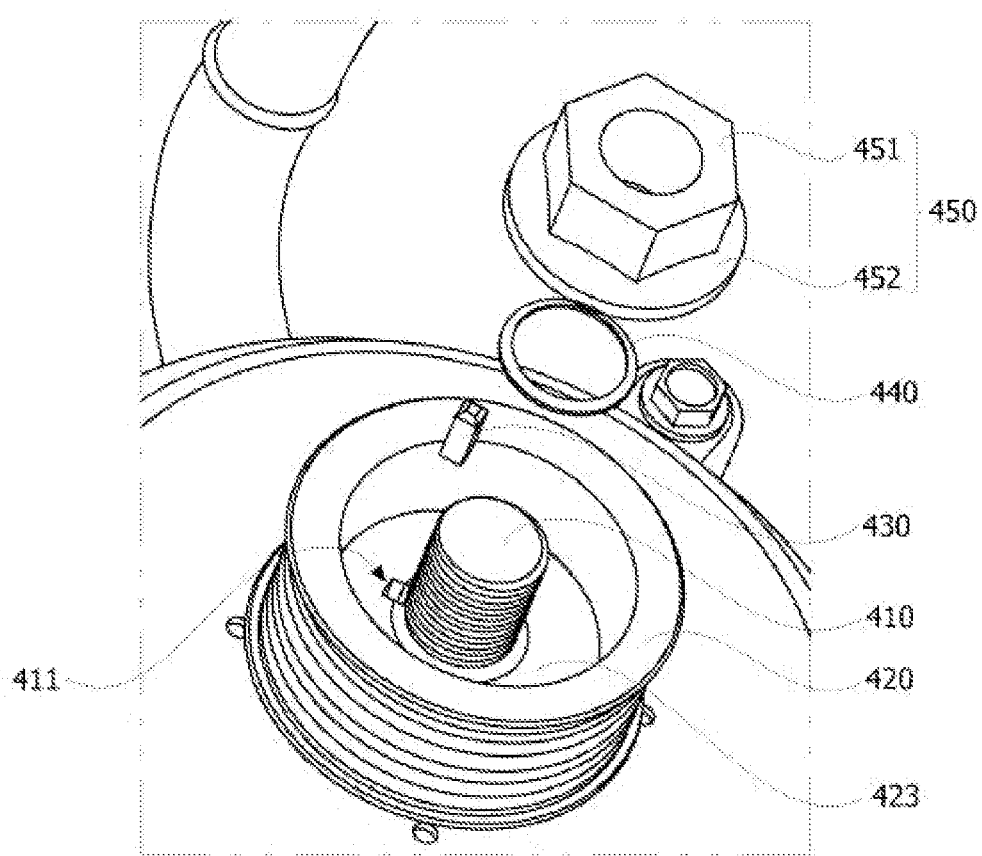
FIG. 3 is a perspective view of portion A in FIG. 1.
Figure 4:
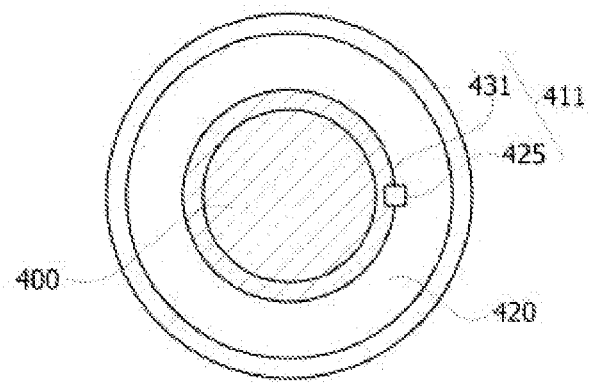
FIG. 4 is a cross-sectional view illustrating a rotary shaft and a pulley belt when viewed from the top, in the belt-driven starter-generator according to the embodiment of the present disclosure.

Referring to FIGS. 2 to 4, a pocket 411 is formed between the rotary shaft 400 and the pulley belt 420. Specifically, the pocket 411 may be defined by a first slit 425 formed on a side wall of the through-hole 424 and a second slit 431 formed on the outer peripheral surface of the rotary shaft 400. The key 430 is press-fitted into the pocket 411, thereby enabling the rotary shaft 400 to be fixed to the pulley belt 420. The rotary shaft 400 and the pulley belt 420 may be stably fixed by the press-fit of the key 430 even though the motor is rotated at a high speed.

When the pocket 411 has a length equal to or less than that of the key 430, the flat surface of the fixed portion 452 presses an upper end portion of the key 430. At least one of upper and lower end portions of the key 430 is tapered such that a cross-sectional area is decreased toward an end. The key 430 may be smoothly press-fitted into the pocket 411.

A height h and a thickness t of the key 430 may be variously selected within a suitable range according to a designer's intention and a product specification. Especially, the thickness t of the key 430 may be determined by the following equation 1.

$$t(mm) = k \times S \times \frac{T}{I} = k \times S \times \alpha \qquad \text{[Equation 1]}$$

where k refers to a proportional constant and may be $1.5 \times 10^{-6}$, S refers to a safety factor, I refers to rotational moment of inertia of the rotor 300 rotated along with the rotary shaft 400, T refers to rotational torque generated by rotation, and α refers to angular acceleration.

The tension washer 440 having a ring shape may be inserted between the key 430 and the coupling member 450. In this case, the length of the pocket 411 may be greater than that of the key 430 by an insertion distance of the tension washer 440.

As such, according to the embodiment, since the pulley belt 420 is stably fixed to the rotary shaft 400, operation reliability may be improved even though the motor having high power and torque is driven. In addition, since the key 430 is press-fitted into the pocket 411 formed between the rotary shaft 400 and the pulley belt 420, assembly convenience may be improved.

Figure 5:
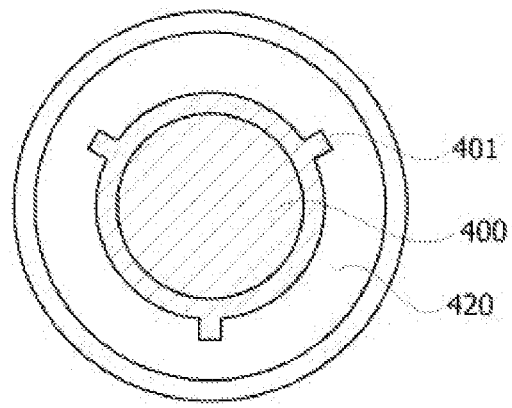
FIG. 5 is a cross-sectional view illustrating a rotary shaft and a pulley belt when viewed from the top, in a belt-driven starter-generator according to another embodiment of the present disclosure.

FIG. 5 is a cross-sectional view illustrating a rotary shaft and a pulley belt when viewed from the top, in a belt-driven starter-generator according to another embodiment of the present disclosure. The structure in which the key 430 is press-fitted into the pocket 411 formed between the rotary shaft 400 and the pulley belt 420 and the rotary shaft 400 is fixed to the pulley belt 420 is described in the above-mentioned embodiment. In FIG. 5, a rotary shaft 400 may also be fixed to a pulley belt 420 by forming at least one protrusion 401 on an outer peripheral surface of the rotary shaft 400 and forming a pocket corresponding to the protrusion 401 on an inner peripheral surface of the pulley belt 420. According to such a configuration, a separate key 430 may not be manufactured.

Figure 6:
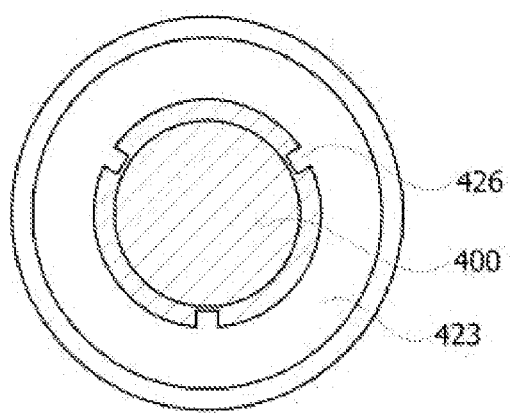
FIG. 6 is a cross-sectional view illustrating a rotary shaft and a pulley belt when viewed from the top, in a belt-driven starter-generator according to a further embodiment of the present disclosure.

FIG. 6 is a cross-sectional view illustrating a rotary shaft and a pulley belt when viewed from the top, in a belt-driven starter-generator according to a further embodiment of the present disclosure. A rotary shaft 400 may also be fixed to a pulley belt 420 by forming at least one pocket on an outer peripheral surface of the rotary shaft 400 and forming at least one protrusion 426, which is inserted into the pocket, on an inner peripheral surface of the pulley belt 420.

The configuration in which the rotary shaft 400 is fixed to the pulley belt 420 by forming at least one protrusion 401 on the outer peripheral surface of the rotary shaft 400 and forming the pocket corresponding to the protrusion 401 on the inner peripheral surface of the pulley belt 420 is described in the above-mentioned embodiment. However, the configuration may also be made in reverse.

In accordance with a belt-driven starter-generator according to exemplary embodiments of the present disclosure, since a pulley belt is stably fixed to a rotary shaft, operation reliability can be improved even though a motor having high power and torque is driven.

In addition, according to exemplary embodiments of the present disclosure, since a key is press-fitted into a pocket formed between the rotary shaft and the pulley belt, instead of lateral insertion of a woodruff key into the rotary shaft, assembly convenience can be improved.

The present disclosure is directed to a belt-driven starter-generator capable of improving operation reliability and assembly convenience even though a motor having high power and torque is driven, by stably fixing a pulley belt to a rotary shaft.

According to an aspect of the present disclosure, a belt-driven starter-generator includes a rotary shaft, a pulley belt coupled to the rotary shaft and configured such that one end of the rotary shaft is exposed therethrough, a pocket formed between the rotary shaft and the pulley belt, a key arranged in the pocket, and a coupling member coupled to one end of the rotary shaft.

The pulley belt may include a receiving groove to which one end of the rotary shaft is exposed, and a through-hole formed on a bottom surface of the receiving groove so that the rotary shaft is inserted into the through-hole, and the receiving groove may have a diameter greater than a diameter of the through-hole and a maximum linear width of the coupling member.

The pocket may include a first slit formed on a side wall of the through-hole and a second slit formed on an outer peripheral surface of the rotary shaft. The belt-driven starter-generator may further include a housing, a stator arranged in the housing, and a rotor rotated along with the rotary shaft.

The housing may include a first housing accommodating the stator and the rotor, a second housing accommodating the first housing, and a fixing portion to fix the first and second housings. The belt-driven starter-generator may further include a cooling channel formed between the first housing and the second housing.

One end of the rotary shaft coupled to the coupling member may have a thread. The coupling member may include a nut portion coupled to one end of the rotary shaft, and a fixed portion connected to the nut portion so as to come into contact with the bottom surface of the receiving groove of the pulley belt.

The pocket may have a length greater than that of the key. The pocket may have a length equal to or less than that of the key. The belt-driven starter-generator may further include a ring-shaped tension washer inserted between the key and the coupling member. The key may have a tapered portion formed on at least one of upper and lower end portions thereof.

According to another aspect of the present disclosure, a belt-driven starter-generator includes a rotary shaft rotated by a motor, a pulley belt coupled on an outer peripheral surface of the rotary shaft, and a coupling member coupled to a thread formed on the outer peripheral surface of the rotary shaft so as to support one side of the pulley belt, wherein at least one protrusion is formed on the outer peripheral surface of the rotary shaft and a pocket corresponding to the protrusion is formed on an inner peripheral surface of the pulley belt.

According to a further aspect of the present disclosure, a belt-driven starter-generator includes a rotary shaft rotated by a motor, a pulley belt coupled on an outer peripheral surface of the rotary shaft, and a coupling member coupled to a thread formed on the outer peripheral surface of the rotary shaft so as to support one side of the pulley belt, wherein at least one pocket is formed on the outer peripheral surface of the rotary shaft and a protrusion, which is inserted into the pocket, is formed on an inner peripheral surface of the pulley belt.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A belt-driven starter-generator comprising:
   a rotary shaft;
   a pulley belt coupled to the rotary shaft and configured such that one end of the rotary shaft is exposed therethrough;
   a pocket formed between the rotary shaft and the pulley belt;
   a key arranged in the pocket; and
   a coupling member coupled to one end of the rotary shaft,
   wherein the pulley belt includes a receiving groove to which one end of the rotary shaft is exposed, and a through-hole formed on a bottom surface of the receiving groove so that the rotary shaft is inserted into the through-hole,
wherein the pocket communicates with the receiving groove, and
wherein the pocket includes a first slit formed on a side wall of the through-hole and a second slit formed on an outer peripheral surface of the rotary shaft, a length of the first slit being greater than a length of the second slit.

2. The belt-driven starter-generator of claim 1, wherein the receiving groove has a diameter greater than a diameter of the through-hole and a maximum linear width of the coupling member.

3. The belt-driven starter-generator of claim 1, further comprising:
  a housing;
  a stator arranged in the housing; and
  a rotor rotated along with the rotary shaft.

4. The belt-driven starter-generator of claim 3, wherein the housing comprises a first housing accommodating the stator and the rotor, and a second housing accommodating the first housing.

5. The belt-driven starter-generator of claim 4, further comprising a cooling channel formed between the first housing and the second housing.

6. The belt-driven starter-generator of claim 1, wherein one end of the rotary shaft coupled to the coupling member has a thread.

7. The belt-driven starter-generator of claim 2, wherein the coupling member comprises a nut portion coupled to one end of the rotary shaft, and a fixed portion connected to the nut portion so as to come into contact with the bottom surface of the receiving groove of the pulley belt.

8. The belt-driven starter-generator of claim 1, wherein the pocket has a length greater than that of the key.

9. The belt-driven starter-generator of claim 1, wherein the pocket has a length equal to or less than that of the key.

10. The belt-driven starter-generator of claim 1, further comprising a ring-shaped tension washer inserted between the key and the coupling member.

11. The belt-driven starter-generator of claim 1, wherein the key has a tapered portion formed on at least one of upper and lower end portions thereof.

12. The belt-driven starter-generator of claim 1, wherein the key is configured to be inserted in to the pocket via the receiving groove.

13. The belt-driven starter-generator of claim 1, wherein the length of the first slit corresponds to a length of the through hole.

* * * * *